US012282875B2

(12) United States Patent
Makhija et al.

(10) Patent No.: US 12,282,875 B2
(45) Date of Patent: Apr. 22, 2025

(54) LINKEDCHAIN, CONTROL TOWER AND BLOCKCHAIN FOR ENTERPRISE APPLICATIONS

(71) Applicant: NB Ventures, Inc., Clark, NJ (US)

(72) Inventors: Subhash Makhija, Westfield, NJ (US); Huzaifa Shabbir Matawala, East Brunswick, NJ (US); Shivendra Singh Malik, Vasco-da-Gama (IN); Vinayak Agashe, Irving, TX (US)

(73) Assignee: NB Ventures, Inc., Clark, NJ (US)

( * ) Notice: Subject to any disclaimer, the term of this patent is extended or adjusted under 35 U.S.C. 154(b) by 681 days.

(21) Appl. No.: 16/730,069

(22) Filed: Dec. 30, 2019

(65) Prior Publication Data

US 2021/0201236 A1    Jul. 1, 2021

(51) Int. Cl.
*G06Q 10/0631*    (2023.01)
*G06F 16/27*    (2019.01)

(52) U.S. Cl.
CPC ....... *G06Q 10/06315* (2013.01); *G06F 16/27* (2019.01); *G06Q 2220/00* (2013.01)

(58) Field of Classification Search
CPC .......... G06Q 10/06315; G06Q 2220/00; G06F 16/27
See application file for complete search history.

(56) References Cited

U.S. PATENT DOCUMENTS

| | | | |
|---|---|---|---|
| 7,870,012 B2 * | 1/2011 | Katz | G06Q 10/087 705/28 |
| 11,250,362 B2 * | 2/2022 | Krishnamoorthy | G06Q 10/06313 |
| 2002/0138316 A1 * | 9/2002 | Katz | G06Q 10/06311 705/7.31 |
| 2002/0174000 A1 * | 11/2002 | Katz | G06Q 10/10 705/7.26 |
| 2002/0178077 A1 * | 11/2002 | Katz | G06Q 10/10 705/7.36 |
| 2005/0278202 A1 * | 12/2005 | Broomhall | G06Q 10/06316 705/7.17 |
| 2013/0211870 A1 * | 8/2013 | Lawson | H04L 43/14 705/7.25 |
| 2014/0019471 A1 * | 1/2014 | Linton | G05B 19/418 707/759 |
| 2014/0058775 A1 * | 2/2014 | Siig | G06Q 10/06 705/7.12 |
| 2015/0046363 A1 * | 2/2015 | McNamara | G06Q 10/0833 705/333 |
| 2015/0120373 A1 * | 4/2015 | Bajaj | G06Q 10/0635 705/7.25 |
| 2016/0104114 A1 * | 4/2016 | Speich | G06Q 10/083 705/338 |
| 2016/0162825 A1 * | 6/2016 | Dan | G06Q 10/067 705/7.37 |
| 2016/0217399 A1 * | 7/2016 | Roelofs | G06Q 10/08 |
| 2016/0260105 A1 * | 9/2016 | Quilichini | G06Q 30/0201 |
| 2017/0006135 A1 * | 1/2017 | Siebel | H04L 69/40 |
| 2017/0039500 A1 * | 2/2017 | Leidner | G06Q 10/0833 |

(Continued)

*Primary Examiner* — Shean Tokuta
(74) *Attorney, Agent, or Firm* — David M. Breiner; BrownWinick Law Firm

(57) ABSTRACT

The present invention provides linkedchain, control tower and blockchain for one or more enterprise applications. The system includes a linked chain within a control tower configured to connect with blockchain and non-blockchain based entity systems.

46 Claims, 6 Drawing Sheets

(56) References Cited

U.S. PATENT DOCUMENTS

| | | | | |
|---|---|---|---|---|
| 2017/0278053 | A1* | 9/2017 | High | G06Q 10/087 |
| 2018/0189731 | A1* | 7/2018 | Nossam | G06Q 10/083 |
| 2019/0258991 | A1* | 9/2019 | Nguyen | H04L 9/0894 |
| 2019/0318350 | A1* | 10/2019 | Hinkel | H04L 9/3247 |
| 2020/0074402 | A1* | 3/2020 | Adato | G06V 20/52 |
| 2020/0097869 | A1* | 3/2020 | Bajaj | G06Q 10/06375 |
| 2020/0210947 | A1* | 7/2020 | Devarakonda | G06Q 10/06312 |
| 2020/0279200 | A1* | 9/2020 | Makhija | G06N 3/049 |
| 2021/0049532 | A1* | 2/2021 | Smith | G06N 20/00 |
| 2021/0132962 | A1* | 5/2021 | Makhija | G06F 9/454 |
| 2021/0133670 | A1* | 5/2021 | Cella | G06N 3/044 |
| 2021/0182996 | A1* | 6/2021 | Cella | G06N 5/022 |
| 2021/0201236 | A1* | 7/2021 | Makhija | G06F 16/27 |
| 2021/0334876 | A1* | 10/2021 | Trim | G06Q 30/0627 |
| 2021/0344582 | A1* | 11/2021 | Samadi | H04L 41/145 |
| 2021/0374632 | A1* | 12/2021 | Côté | G06N 20/00 |
| 2021/0398045 | A1* | 12/2021 | Hanebeck | G06Q 10/06315 |
| 2022/0036302 | A1* | 2/2022 | Cella | G06N 20/00 |
| 2022/0187847 | A1* | 6/2022 | Cella | G06Q 10/06 |
| 2022/0197306 | A1* | 6/2022 | Cella | G05B 19/41865 |

* cited by examiner

LINKEDCHAIN, CONTROL TOWER AND BLOCKCHAIN FOR ENTERPRISE APPLICATIONS

BACKGROUND

1. Technical Field

This disclosure relates generally to enterprise applications (EA) and supply chain management (SCM) applications. More particularly, this disclosure relates to blockchain based and linked chain implemented control tower system and method of operating one or more applications including enterprise resource planning (ERP) and supply chain management (SCM) applications.

2. Description of the Prior Art

Most of the organizations utilize enterprise applications for controlling various functions. Moreover, for organization involved in product and services, demand and supply network are the most critical aspects for ensuring smooth functioning. The enterprise applications include various servers, databases, and computer-based systems for managing several internal and external aspects of an organization's enterprise level requirements. The requirements may be in areas such as sales, finance, logistics, and inventory management, among others.

In extended supply chain, it is important to connect demand with the supply from extended network. With the advent of blockchain technology, the objective of connecting demand and supply is becoming challenging. Some of the organizations deal with entities that are completely based on blockchain network while others are still working with non-blockchain implemented processes. Also, the data stored and processed internally with the entities are in silos and makes it very difficult to be utilized. Working with such data of different types and characteristics along with other processes including extraction, cleansing of this silos data in real time is extremely cumbersome requiring technical modifications to the structural architecture of the existing ERP systems. Dealing with such distinct setup is extremely challenging as any enterprise application that is unable to support the different requirements of these entities would impact operations due to non-collaboration among the entities like distributors, factories, customers and suppliers.

Also, some of the organizations implement control tower systems to have enhanced visibility within the organization functions, as well as cross-organization visibility into extended business operation. The Control tower which acts as a centralized hub enables short-term and long-term decision making for enterprises. However, such systems are not capable to deal with distinct technology platforms from different entities. Moreover, the nuances involved with ensuring handling dynamic changes in data or set-up across different modules requires complex restructuring which is not available. Any change in a scenario would impact multiple entities and functions thereby effecting the demand and supply chain. The existing enterprise systems are not capable of accommodating the modifications required in the structure dynamically to ensure smooth functioning of the operations.

Since, every enterprise system has larger footprint of digital platforms, multiple technologies and less standardization, one of the biggest hurdles is to manage complex interfaces and data validations across enterprises. Hence integrating with all source systems is time consuming process also data collection depends on rules defined by the enterprises. This overall leads in delay of consolidation and aggregation of the data and in turn leads to operational decisions that are not in congruence with the most up-to-date data.

Accordingly, there is a need in the art for improved system and method that deals with control of functions in multiple entities through the enterprise application efficiently.

SUMMARY OF THE INVENTION

Accordingly, this disclosure provides a linkedchain, control tower and blockchain based system for operating one or more enterprise applications. The system interacts with multiple entity nodes/blocks as part of a blockchain network.

In an embodiment, the invention provides a linkedchain based Control tower system for operating one or more applications. The system includes a server configured to receive at least one impact data from at least one information object. The system includes a control tower connected to the server wherein the control tower includes an ingestion layer including at least one linking object configured to connect to at least one data object to form a linked chain, an analysis module coupled to an artificial intelligence (AI) based rule engine configured to identify at least one impact of the received data on one or more functions of the applications to create at least one application scenario. The control tower system includes a recommendation engine configured to process a plurality of historical datasets and the application scenario to recommend action based on a dynamic processing logic, wherein the control tower is configured for generating a processing path based on the recommended action wherein the processing path is generated after identification of relevant blocks of the at least one data object for execution of the recommended action.

In an embodiment, the invention provides a control tower linkedchain for operating one or more applications. The linked chain includes at least one connector element configured to connect a control tower to at least one data object, a linked chain sync object to synchronize the control tower with the at least one data object; and a linked chain sync data store for storing a plurality of sync data generated from the at least one data object, wherein the linked chain is configured to connect the at least one data object to one or more applications through the control tower thereby enabling the control tower to incorporate changes in one or more functions of the one or more applications in real time based on an impact data.

In an exemplary embodiment, the control tower of the invention includes a tracking module configured to interact with a plurality of nodes associated with the data objects and the one or more applications wherein the nodes are configured to interact with each other for performing a plurality of functions. The control tower may also include a sensing means for sensing receipt of an event impacting the functions to be carried out by the one or more applications. The tower through analytics module processes the impact data for predicting a reconfiguration protocol for the system where the reconfiguration is implemented based on identification of faster processing path to execute a recommended action.

In an embodiment the invention provides a method of operating one or more applications by a linkedchain based control tower. The method includes the steps of receiving at least one impact data from at least one entity at a server;

identifying impact of the received data on one or more functions of the one or more applications to create at least one application scenario; processing historical data and the application scenario to recommend action based on a dynamic processing logic; and generating a processing path by a control tower based on the recommended action wherein the processing path is generated after identification of one or more relevant blocks of at least one data object for execution of the recommended action.

In an embodiment, the invention provides a blockchain network for operating one or more application. The network includes a plurality of data block associated with one or more data objects and one or more entities connected to form a blockchain, a control tower including an ingestion layer configured for connecting to the plurality of data blocks through at least one connecting element, and an application server connected to the control tower and configured for interacting with the control tower based on a communication protocol for execution of operations through the application. The control tower connects to one or more nodes of data objects and the applications to identify relevant blocks within the data objects for generating a processing path. The processing path creates a sub-blockchain network for execution of a recommended action through the processing path.

The present invention provides several advantages over the prior art. For example, in one advantageous aspect, the present invention provides a linkedchain, blockchain and control tower-based enterprise application system and a method for operating the same with faster processing times, reduced error and accurate data flow across the platform. The system utilizes sub network of devices and server forming a sub-blockchain network for secured communication with reduced processing time due to automatic creation of processing path by a bot based on data models working with identified block of data objects, the impact data and AI based processing logic for recommending an action/task to a user. The system includes reconfiguration of a plurality of functions of the one or more applications in real-time based on the recommended action/task for accurate results. All of this results in a significant improvement in the overall functioning of an enterprise application.

In an advantageous aspect, the system and method of the present invention optimizes resources by considering the customer demand and supply market conditions in real time even when some elements of the supply chain may be impacted due to natural calamity, epidemic or unavailability due to other impactful events. The system is driven by linked chain of the control tower that connects with data across blockchain networks of one or more entities in the entire supply chain network.

In an advantageous aspect, the system of the present invention is not limited to a single set of rules, logic and workflow. The rules, logic, workflow change based on the data objects connecting with the control tower where the data object may vary by industry, geography, commodity etc. to transform the one or more application functions for achieving accurate, faster and efficient processing results.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
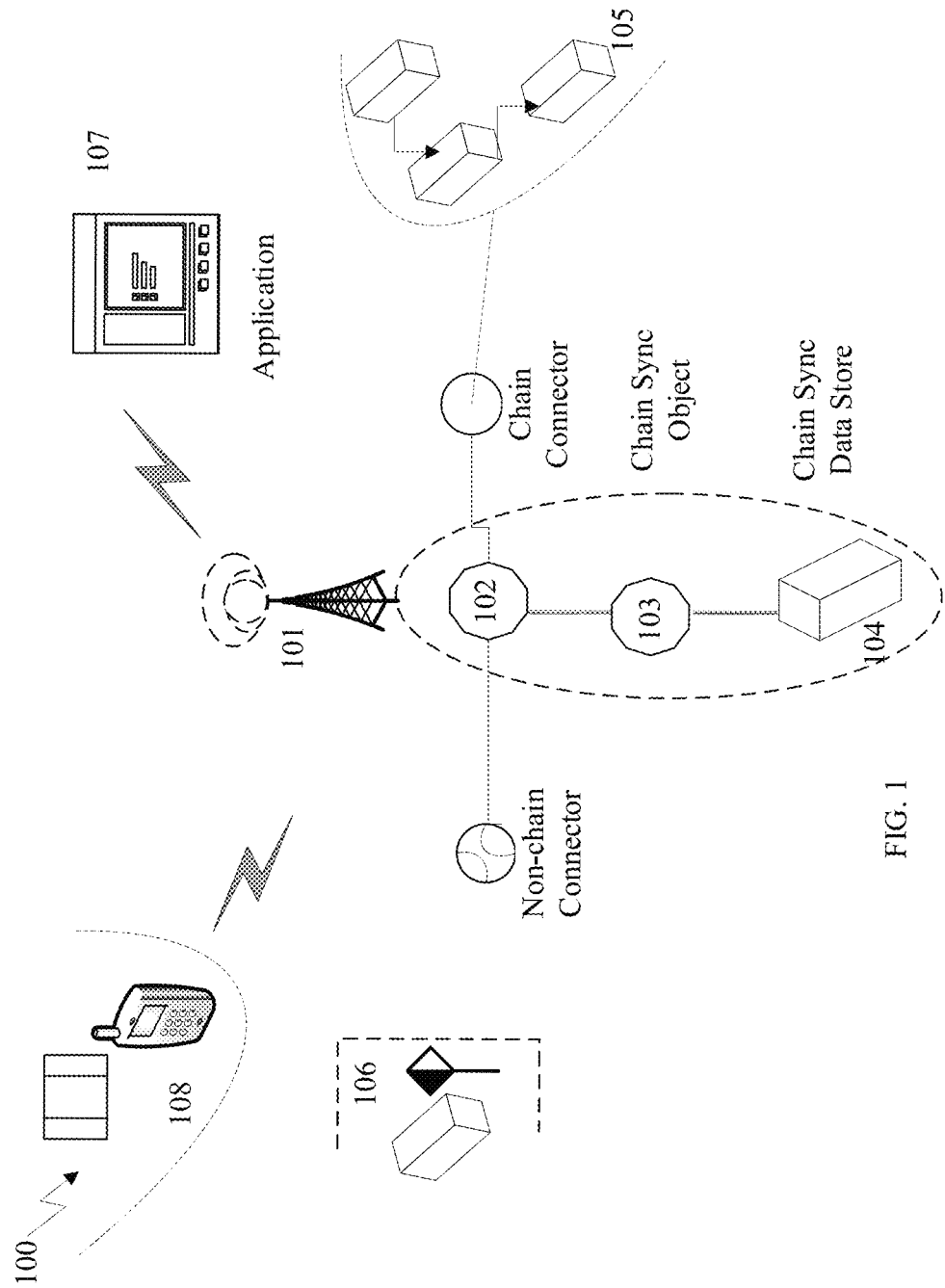
FIG. 1 is a view of linked chain control tower connector architecture in accordance with an embodiment of the invention.

Described herein are nonlimiting example embodiments of the present invention, which includes Artificial Intelligence, machine learning, blockchain, linked chain and control tower based, systems and methods for operating one or more enterprise applications.

The various embodiments including the example embodiments will now be described more fully with reference to the accompanying drawings, in which the various embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the sizes of components may be exaggerated for clarity.

It will be understood that when an element or layer is referred to as being "on," "connected to," or "coupled to" another element or layer, it can be directly on, connected to, or coupled to the other element or layer or intervening elements or layers that may be present. As used herein, the term "and/or" includes any and all combinations of one or more of the associated listed items.

Spatially relative terms, such as "linked chain," "connectors," or "data blocks," and the like, may be used herein for ease of description to describe one element or feature's relationship to another element(s) or feature(s) as illustrated in the figures. It will be understood that the spatially relative terms are intended to encompass different orientations of the structure in use or operation in addition to the orientation depicted in the figures.

The subject matter of various embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, the various embodiments including the example embodiments relate to linked-chain based control tower system and methods for operating one or more enterprise application.

Referring to FIG. 1, a connection architecture 100 of a linkedchain based control tower system is shown in accordance with an embodiment of the invention. The connection architecture 100 includes a control tower 101 having at least one linking object 102 configured for connecting with one or more data objects. The linking object 102 includes at least one chain connector 102A and a non-chain connector 102B.

The chain connector 102A is configured to link to a blockchain network data object 105. The non-chain connector 102B is configured to link to a non-blockchain network data object 106. The control tower further includes a linked chain sync object 103 and a linked chain sync data store 104. The linked chain sync object 103 synchronizes control tower 101 with the data objects (105, 106). The linked chain sync data store 104 is configured to store and sync data generated from the data objects (105, 106). The control tower 101 is structured to connect with a plurality of data objects/sources including IOT devices 108 and also one or more entities operating one or more applications 107.

In an embodiment, the linked chain sync object 103 is responsible to synch a plurality of data blocks from one or more entities to persistent store, decode meta data and details. The Linked chain sync object 103 includes multinode compute engine triggered based on blocks. It also fetches additional information related to block from off-chain. The blocks are pushed to store based on different groups.

In another embodiment the linked chain sync store 104 includes persistence repository to store series of data generated from a linked chain. The transactions generated by the Chain Sync object 103 are appended. It is maintained to store historical data primarily with in the scope of Control tower 101 for auditing and compliance. The repository acts as an input to a Control tower data platform.

In an embodiment, the data object (105, 106) includes distinct data sources entities, retailers, suppliers, demand drivers, distributers, clients, logistics companies, third party manufacturers or mobile and IOT device management companies, channel & marketing partners, customer feedback collectors including social sentiments, survey management companies, entities including sales data, sensors data from manufacturing plant, sensors bit info from logistics, sensors data from warehouse management on item location, item tracker entities, feedback from end customers through bloggers, feedback data from channel partners, purchase Order data from enterprise systems, invoices and sales order from customers, external entities including global economy, market indices details, inventory stock from warehouse.

In an embodiment, the IOT device 108 includes smart devices that capture data from one or more nodes and sends them to the Control tower 101. The control tower 101 enables easy communication between the nodes/blocks and provides visibility to manage the plurality of functions across the one or more applications 107. The Control tower 101 is configured for real time visualization of flows in the one or more applications, switching between data models, setting up alert-notifications, data analytics, ensuring security of the data.

Figure 1A:
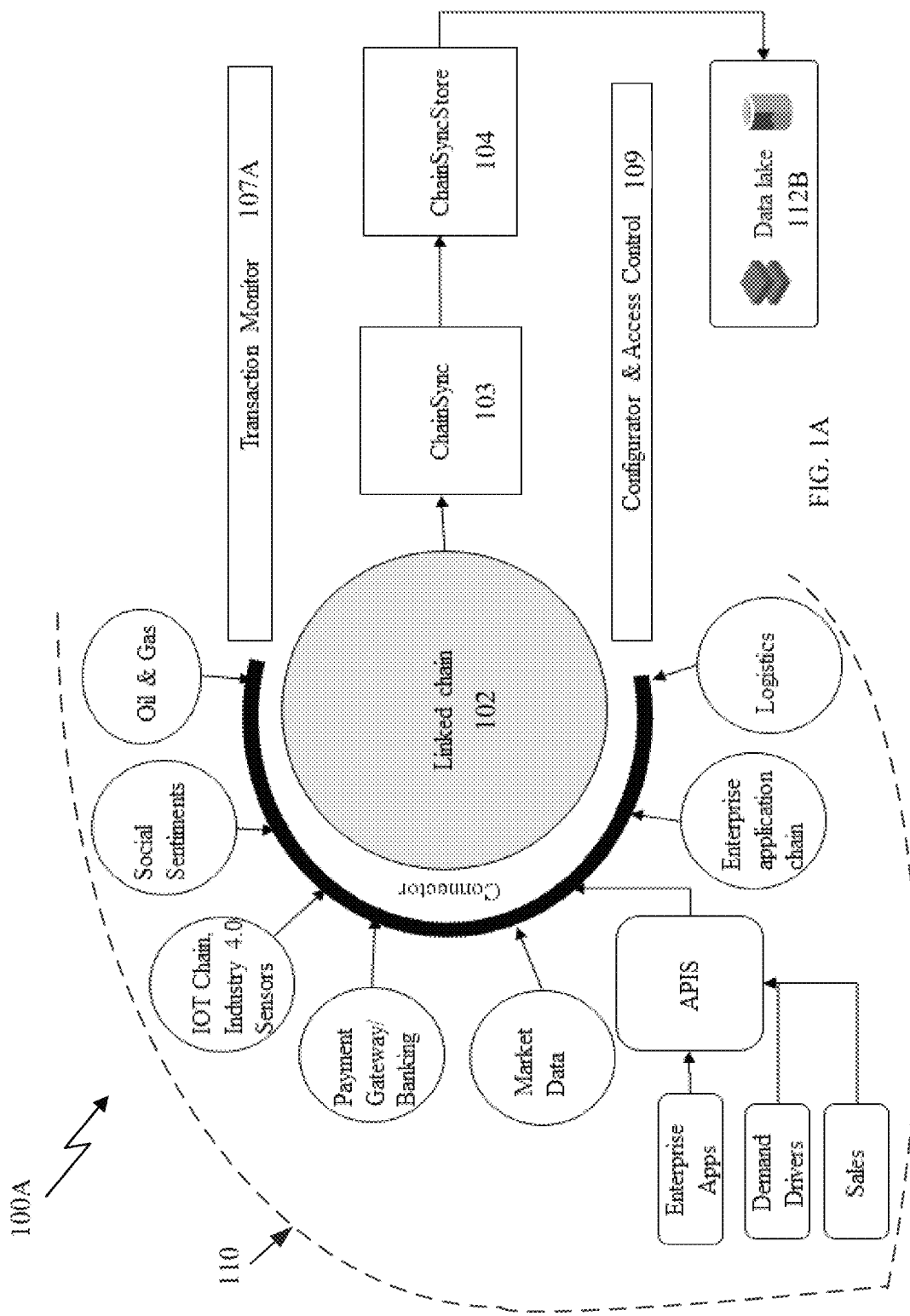
FIG. 1A is a block diagram of control tower connectors depicting the data sources connected to the Control tower through linkedchain in accordance with an embodiment of the invention.

Referring to FIG. 1A, a linkedchain control tower block diagram 100A is shown in accordance with an embodiment of the present invention. The linkedchain includes a plurality of connecting elements configured for connection to multiple data objects/data sources 110 including logistic companies, enterprise application chain, APIs connected to enterprise applications, demand drivers and sales. The data sources 110 also includes retailers, suppliers, distributers, clients, third party manufacturers or mobile and IOT device management companies, channel & marketing partners, customer feedback collectors including social sentiments, survey management companies, entities including sales data, sensors data from manufacturing plant, sensors bit info from logistics, sensors data from warehouse management on item location, item tracker entities, feedback from end customers through bloggers, feedback data from channel partners, purchase Order data from enterprise systems, invoices and sales order from customers, external entities including global economy, market indices details, inventory stock from warehouse. The linkedchain connects the linked chain sync object 103 and linked chain sync data store 104 to a data lake 112B. The control tower linkedchain also includes configurator and access control module 109 configured for connecting the chain connector 102A and non-chain connector 102B to the data objects after validations. The module 109 enables configuration of access control protocols for accessing data from data lake 112B of the system. The module 109 enables connecting to other network. Also, through admin portal, system administrator will be able to manage additional networks and access control. The control tower system provides a transaction monitor 107A as an interface for enabling monitoring of data flow through the control tower 101 when connecting data object to the one or more applications. The monitor 107A provides visibility and dashboard for end to end transaction connecting through APIs to monitor transaction time, compliance, tokens, transaction time etc. It will notify system administrator in case of exception.

In an exemplary embodiment, they control tower system 100 includes at least one block connector associated with at least one linking object and configured for extending connection of the linking objects to a new data block of the network wherein the new data block is added to the network through a control tower reconfiguration protocol. The block connecter acts as a branch configured to perform data validation, block validation and configuration compatibility before extending connection to the new data block.

In an embodiment, the linked chain control tower 101 includes a chain connector element 102A that supports connectivity to other blockchain network using standard blockchain protocols. It has an ability to connect and ingest signals from multiple types of ledger. Connect to public and other private blockchain. It will also connect to off-chain data to fetch complete transaction. In few scenario chains will be connected through pegging.

In an embodiment, the linked chain control tower 101 includes a non-chain connector element 102B that acts as a transaction builder subcomponent to chain connector is responsible to fetch data from external APIs and user interface and sign transactions before sending to tower linkedchain.

Figure 1B:
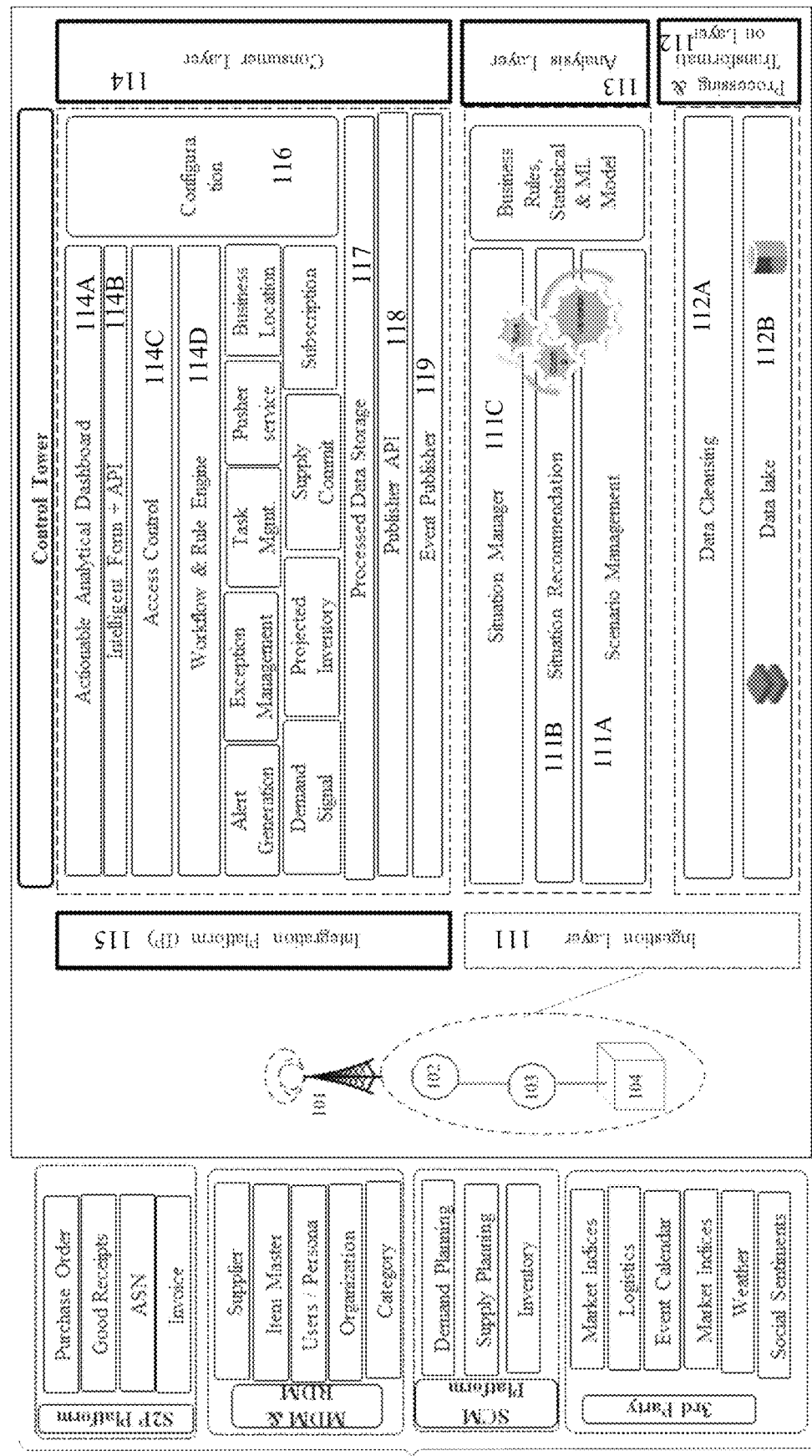
FIG. 1B is a control tower system architecture for operating one or more applications in accordance with an embodiment of the invention.

Referring to FIG. 1B, a control tower architecture 100B connected to multiple data sources 110 and application 107 components is shown in accordance with an embodiment of the invention. The control tower architecture 100B includes control tower connection structure 101, having an ingestion layer 111 with plurality of linking objects (102, 103, 104). The ingestion layer 111 also includes a situation manager module 111C, situation recommendation module 111B and scenario management module 111A. The architecture 100B also includes a processing and transformation layer 112 including a data cleansing engine 112A and the data lake 112B. The layer enables processing and data transformation to store extract, convert structure/semi structure/unstructured format. The layer data cleansing engine 112A cleanse, enrich and classify data received from multiple data sources and stored in the data lake 112B. The data cleansing includes data normalization through natural language processing and machine learning. Further, the data classification is performed through various historical training data models configured to train datasets stored in the data lake 112B. When a new data object is connected to the control tower 101 through linked chain, the connecting elements fetches the data of the new data object and stores it in the data lake 112B. The data is then classified based on the training data models and in case new data elements the system is configured to reconfigure the training model based on the new data elements and learn from it to process the data. The control tower architecture includes an analysis layer/module 113 coupled to an AI based rule engine configured for identifying an impact of the received data on one or more functions of the applications to create at least one application scenario. The analysis module 113 leverages the data from the layer 112. The analysis layer/module 113 uses statistical and machine learning data models to process information based on an impact data. The architecture 100B includes a consumer Layer 114 and an integration platform 115. The consumer layer 114 is the interface that provides actionable analytics dashboard 114A, intelligent form and API tool 114B for enabling an admin user to reconfigure the application interface based on the required operation of the enterprise application. The layer 114 includes access control module 114C configured to access multiple tools on the application depending on the access protocol defined by the system. The layer 114 also includes workflow and rule engine 114D configured for defining user roles and work flows for working on the application.

In an example embodiment, the analysis module 113 leverage key data elements in real-time from processed data Lake 112B, such as the delivery time, inventory availability, transportation costs, how carrier is performing, Change in shipment value in past x days, on time order fulfillment. Combination of Cognitive service and customer operational rule to provide suggestion and recommendations to optimize operational cost. The analysis module provides end to end resolution including recommendation, approval, in progress, complete status to one alert or more than one alerts. The analysis module enables configuring of rules and data validations to generate different types of alerts for specific items based on plant, construction site, distribution center, and refinery. The analysis layer consistently focuses on orders by tracking supply chain milestones, sending alerts, trace and track granular visibility into the order details when impact data is received.

In an embodiment, the impact data includes attributes of different types including alphabets, numbers, images, wherein the tower is configured for controlling application of multiple data models on the received data including switching between data models in real-time.

In an embodiment the system of the invention includes a data validation engine configured for analyzing and validating data received from the one or more blockchain network. The blockchain will act as multi party abstraction layer. The control tower 101 receives data from multiple sources with varied data models and structure. The system data validation considers data consistency, accuracy and meaningful. Basic validations will be around null values for critical attributes. The system includes data correctness check as the value may be valid but not correct, for example, a ZIP code is a valid number, but it is not consistent with a street. Data Duplication Check for duplicates based on unique key. Data accuracy and reliability based on Uniformity of data received from multiple sources. The system identifies source of truth based on rules.

In an example embodiment, the application scenario includes a scenario created based on impact data due to occurrence of an event. Considering, impact of a weather disaster events like hurricane, floods, tornadoes, drought, heat waves, hail storms in region has high upside or downside reaction on the demand and supply of the products. In case of a freeze in a geographical region, it may cause a decrease in the supply of oranges. This decrease in supply would lead to an increase in the price of oranges, and hence an increase in the price of orange juice. As the price of orange juice rises, there will be a decrease in quantity demanded. For rebuilding, the demand for lumber will increase in hurricane impacted regions. In some scenario, stocks of lumber will be destroyed in hurricane region in-turn shortage in supply. Feed from news channel, social media, health policies, policies of importing and exporting countries will have impact on demand and supply of food items. Articles published on chemical sprayed on apples will decrease demand. It will have impact on cost of the apple. Demand of alternate preference fruits will increase. The advancement in technology will decrease the price of input goods or alternate materials are available from sources in lower price will lead to decrease in production cost and increase in demand. On the other hand, barriers in international trade laws and increase in tariffs will increase cost the product or alternative products, Demand of the product will decrease, and consumers will focus on domestic products causing increase in demand of domestic items, the supply will increase. Economic indicators, depreciation of dollars will have impact of demand and supply. If dollar depreciates the demand for imported goods will increase and will negative impact if dollar appreciates.

In an exemplary embodiment, for all above application scenarios, control tower 101 picks up signals from various sources systems, and automatically triggers demand sensing algorithm. Demand sensing uses machine learning to come up with an accurate forecast of the demand pattern in the region which may have upside impact on certain products, or downside impact on certain other products. The Control tower 101 sees the changes in forecast, notifies supply planner, and triggers a supply planning algorithm automatically when demand change is above a certain value. This helps align supply with demand in an automated fashion. In turn, in an extended supply network, it allows the enterprise to collaborate with supply network partners (contract manufacturers, and extended supplier network). Any shortages of supply are highlighted, and the control tower 101 shows alerts around the same with automated suggestions for resolution using machine learning algorithms where looking at the way these types of problems have been resolved historically, and comes up with feasible, cost effective suggestions such as getting additional supply transferred from an alternate location within certain distance radius from the location.

In an exemplary embodiment, the control tower architecture 100B includes a configuration module 116 enabling an admin user to configure the application to perform a plurality of functions including report generation, exception management, task management, pusher service, location determination, demand signal, projected inventory, supply commitment and subscription. The architecture is configured for storing data flowing in and out of the system at a processed data storage unit 117.

In another exemplary embodiment, the architecture 100B includes publisher API 118 and even publisher 119. The Publisher or Rest API 118 provides features for managing subscriptions, alerts, and messages. The entities/Consumers (Control Tower App, Mobile, Bots, Enterprise Apps) register and manage alerts and notifications. APIs are used by entities/consumer to get data from event publishers service. The event Publisher 119 provides a centralized location for events and a consistent way of managing events and querying for events. The events produced by situation manager module 111C are captured by event publisher broker service. After receiving an event, the event broker service notifies event entities/consumers that are subscribed to the event. The publisher is responsible to dispatch messages published by situation manager 111C and invokes API. The events are technical payloads that triggers the services by sending messages to alert the entities operating on the one or more applications.

In an embodiment, the scenario management module 111A in the analysis layer relies on live feed from data lake 112B. It includes rule-based data policy engine to enable business users to define rules for data validation across multiple data elements and objects. Using Admin portal business users will be able define orchestration layer and workflow based on ingested datasets. Rule engine will publish alerts to message broker such as automate massive decision-making batches, execute policies/rules simulations on large historical dataset and real time data streams, detect situations on data lakes. The rules are authored using rule designed and versioned along with logs and audits in separate data repository. The data repository is a combination of NOSQL and hierarchy data model. Integrated platform compute engine fetches latest deployed rule service and models for customer and industry. At runtime, the engine applies riles against a large data set which are executed in parallel.

In an embodiment, an admin User selects data elements from various data models and datasets. The Query language (QL) translator will interpret the domain knowledge terminology into tokens.

In an embodiment, based on industry domains, predefined rules will be executed for default threshold values. Using ML system will have self-learning and auto correction mechanism. On selected use case, data sets across industries will be considered. Each rule job is given a part of the data, it sends the portion to an instance of rule engine for processing. Rule Engine is embedded within big data compute query engine. Data created by the rules are combined by consolidated engine for aggregated results.

Figure 2:
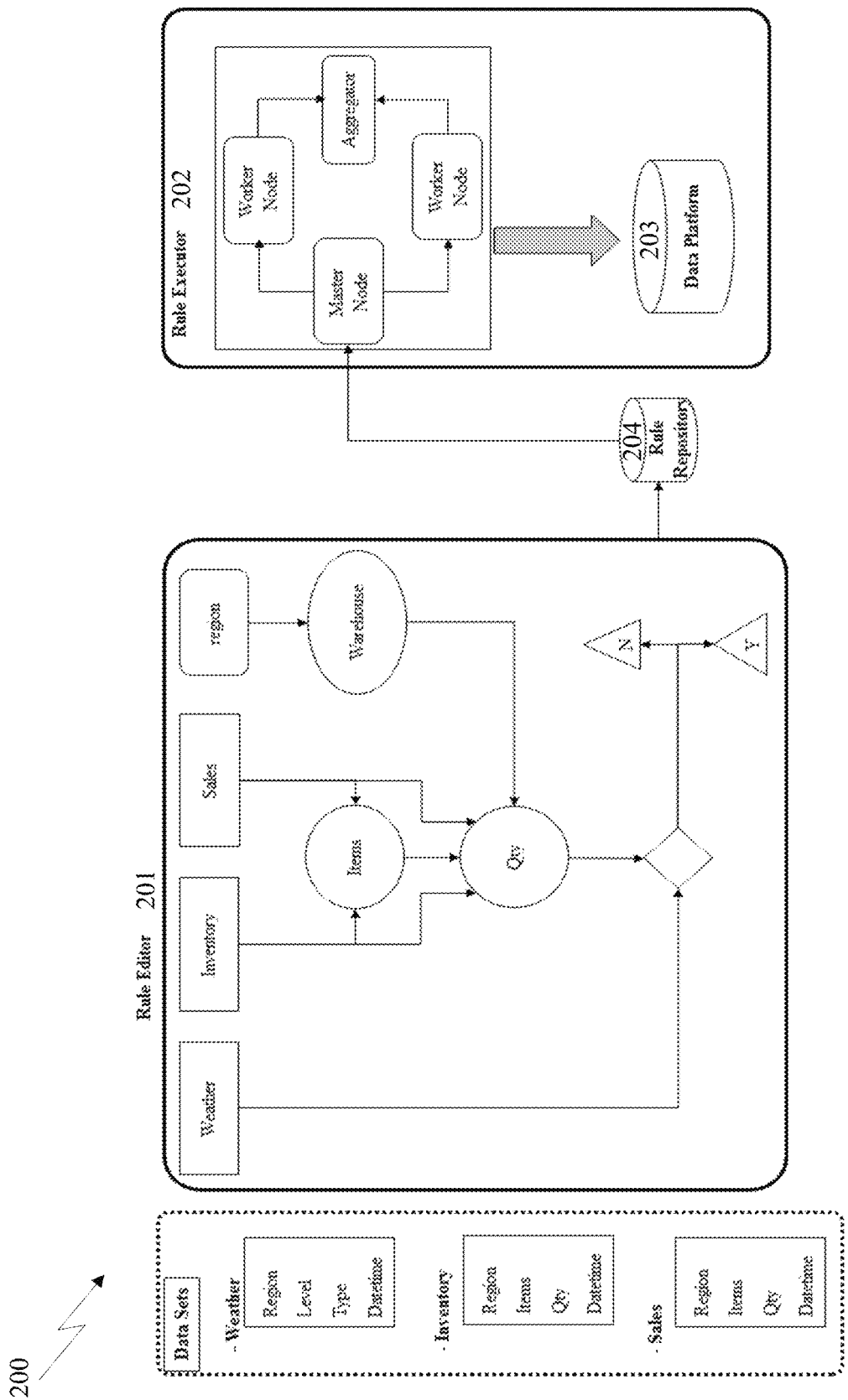
FIG. 2 is a rule editor of the control tower system in accordance with an embodiment of the invention.

Referring to FIG. 2 a rule block 200 is shown in accordance with an embodiment of the invention. The rule block includes rule Editor 201 used to manage & generate rules. Unique graphical notations will assist users to define rules and application/function criterion. Rule Editor 201 has an option for the user to mock scenario and validate the outcome of complex multiple rules. Rules includes multiple authors and hence rules executed through rules executor 202 after finalization by final approver. Rules are deployed on a data platform 203 by a compute engine. Engine Editor will help for prototyping and mocking scenario using predefined data sets. The rules are stored in a rules repository 204. The system includes a rule aggregator configured for interacting with the identified blocks and a master node of the control tower 101 wherein the master node is encoded with instructions and functions as a bot for executing the recommended actions.

In a related embodiment, rule engine is designed to handle high volume of data. Rules can be refined based on historical data sets and reapplied on live feeds coming from multiple sources. Compute is over multiple clusters (worker nodes) running in parallel in cloud environment. Each worker nodes will have a copy of the rules cached. The worker nodes are managed by master nodes which is responsible to share the data across compute nodes. Aggregator node is responsible to collect output of rules from worker nodes. On aggregated data, conflict resolver rules are executed. The output of the rules is pushed on data platform 203. The rule block includes conflict resolver self-correcting mechanism based on the historical data and refined values received from administrator, validates against custom priorities and ML based domain models.

In an example embodiment, an application scenario is Stock Visibility and Corrective action. The system looks at probable options on which stocks can be surplus or will have shortage on different criterion. For a specific entity category and region, data from multiple data sources is checked, including internal platform, legacy external systems and $3^{rd}$ party devices and sales data. Some regions are highly vulnerable to events such as a natural disaster like Hurricane. The application scenario is created using rule engine on large data sets and real-time streams feeds from data sources as:
{Datasets[Weather].region1.condition.type='hurricane' and weather.regon1. condition.level=('high' or 'critical') && DataSets[inventory].region1.warehouse.product['medicine'].quantity<historical(inventory.warehouse.product ['medicine'].quantity,daterange))}

In an embodiment, the situation recommendation module 111B is a recommendation engine that enables recommendations along with processing path for executing the recommendation. These recommendations are generated by AI engine based on scenario generated and rules executed by the scenario management module 111A.

In an example embodiment, in case of shortage of specific stock items in a hurricane effected region, situation management module 111B and AI engine will provide options to transfer inventory items from region 1 to region 2 (effected region) considering various criterion and primary will be shortest time to deliver stocks in region 2. The AI engine will verify historical logistics data to transfer items between locations during time of the year, type stock, availability of trucks, traffic conditions, distance etc. In some cases, the AI engine might provide higher recommendations for regions even they are further away but mostly like to reach faster due to traffic and weather focus in the path. The outcome of the engine is sent to Situation Manager 111C.

In an embodiment of the invention, the situation manager module 111C is responsible to send the messages in real time to all entities that subscribe to specific scenario (region, product etc). It provides insights to multiple recommendations and actions required. The situation Manager module 111C will message broker to publish the messages. The entity subscribes messages based on various criterion like product type, category, region. It continuously sends messages to all the entities. The entities decide if they are active listener for that type.

In an exemplary embodiment, the control tower 101 may be a hardware component or a software component or a combination of hardware and software components integrating multiple data objects through one or more applications implemented on a cloud integration platform.

In an embodiment, the software component is a bot as a computer program enabling an application to integrate with distinct data source devices and systems through a linked-chain based control tower by utilizing Artificial intelligence and blockchain networks. The hardware includes memory, processor, controller and other associated chipsets especially dedicated for performing recalibration of data models to carry out functions for EA.

Figure 3:
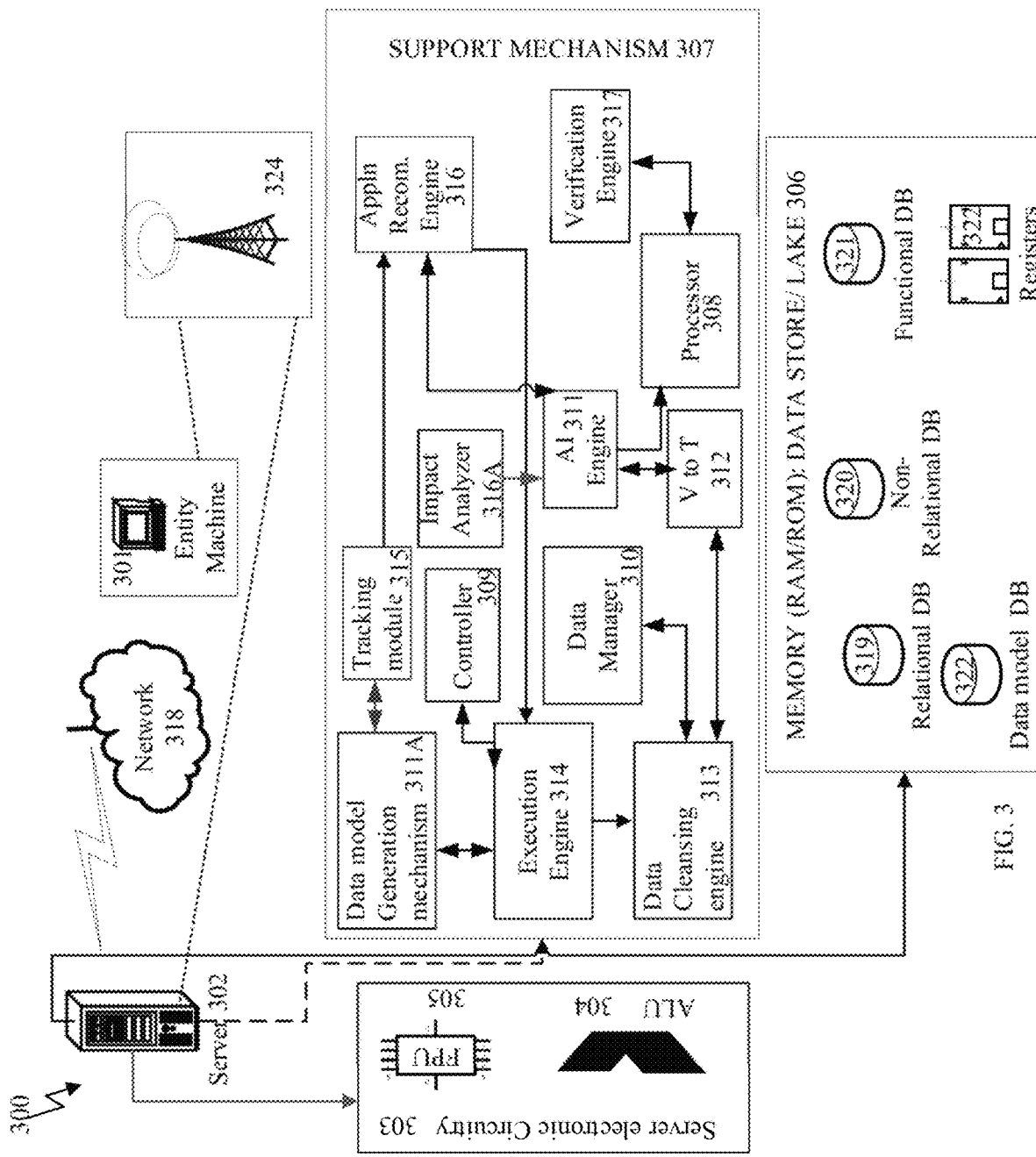
FIG. 3 is a system architecture of the application implementing inputs from the control tower in accordance with an embodiment of the invention.

Referring to FIG. 3, an integrated system application architecture 300 configured for processing real time changing data impacting the application functions and multiple distinct entities is shown in accordance with an embodiment of the invention. The architecture 300 includes at least one computing device/entity machine 301 for initiating at least one function to be performed on the one or more application over a network. The system 300 further includes a server 302 configured to receive input from the entity machine 301. The system 300 includes a support architecture 307 for performing the functions on the one or more application depending upon the type of input received at the server 302. The system 300 includes a data lake 306 for storing plurality of data from distinct sources, where the data includes, text data, voice data, image data, functional data, data models, scripts etc. to be processed based on Artificial intelligence and machine learning. The system 300 connecting various elements through a network 318. The network 318 enables formation of sub networks depending on the requirement of the function to be performed on the application.

In an exemplary embodiment, the data lake 306 is configured for storing historical datasets related to operations including inventory management, delivery management, transportation management, work order management, demand and supply planning, forecast, purchase order and invoice, real-time streams from manufacturing devices and consumer preference in regions, feeds from weather, social sentiments, economic and market indices.

In an exemplary embodiment, the system of the present invention operates one or more applications include enterprise applications (EA) including supply chain management (SCM) applications.

In an embodiment, the enterprise applications include finance applications like automated billing applications and payment processing applications, Customer relationship management applications (CRM) and enterprise resource planning applications (ERP).

In an embodiment, the entity machine 301 may communicate with the server 302 wirelessly through communication interface, which may include digital signal processing circuitry. Also, the entity machine 301 may be implemented in a number of different forms, for example, as a smartphone, computer, personal digital assistant, or other similar devices. The entity machine 301 includes internal circuitry that may include processor, memory and storage device.

In an embodiment the server 302 of the invention may include various sub-servers for communicating and processing data across the network. The sub-servers include, but are not limited to, content management server, application server, directory server, database server, mobile information server and real-time communication server.

In an example embodiment, the server 302 may include electronic circuitry 303 for enabling execution of various steps by a processor of the server 302. The electronic circuitry 303 has various elements including but not limited to a plurality of arithmetic logic units (ALU) 304 and floating-point Units (FPU) 305. The ALU 304 enables processing of binary integers to assist in formation of a tables of data block identifiers where a plurality of data models associated with one or more functions of the application is applied to impact data for determining the data blocks being impacted due to occurrence of an event thereby impacting multiple functions like demand planning, supply planning, forecasting, budgeting etc. in applications like ERP or supply chain management. In an example embodiment, the server electronic circuitry 303 as shown in FIG. 3, may additionally include other processors, memory, storage devices, high-speed interfaces connected through buses for connecting to memory and high-speed expansion ports, and a low speed interface connecting to low speed bus and storage device. Each of the components of the electronic circuitry 303 are interconnected using various busses and may be mounted on a common motherboard or in other manners as appropriate. The system includes a processor 308 that can process instructions for execution within the server 302, including instructions stored in the elements of the data store/lake 306 like memory or on the storage devices to display graphical information for a GUI on an external input/output device, such as display coupled to a high-speed interface. In other implementations, multiple processors and/or multiple busses may be used, as appropriate, along with multiple memories and types of memory. Also, multiple servers may be connected, with each server providing portions of the necessary operations (e.g., as a server bank, a group of blade servers, or a multi-processor system).

In an example embodiment, the support architecture 307 of the system 300 includes a controller 309 encoded with instructions enabling the controller 309 to function as a bot configured to generate plurality of data models for processing impact data to execute a plurality of enterprise application functions based on the information provided by a control tower 324 related to identified data blocks of one or more data objects defining a processing path. The controller 309 selects an Artificial Intelligence based dynamic processing logic using the bot to reduce the processing time for performing multiple functions based on the processing path. The system processor 308 is configured to process various functions based on the AI based processing of impact data and data models by the bot. The support architecture 307 includes a data manager 310 for monitoring execution of a recommended action based on the identified processing path.

In an example embodiment, the impact data may include information impacting operations of the application like increase in lead time during inventory or transportation function of a supply chain application. The support architecture 307 includes an AI engine 311 for determining relevant data models stored in a data model database 322 and created by a data model generation mechanism 311A for execution using the bot based on data sets received at the data lake 306. The support architecture 307 further interacts with the control tower 324 for controlling a plurality of functions associated with the one or more applications wherein the control tower 324 determines most appropriate path for execution of a recommended action based on the application scenario and impact data.

In one embodiment, the support architecture 307 may include image processing unit, for processing an image data and converting it to a text data. Also, the architecture 307 may include a voice to text convertor 312 for enabling faster and accurate conversion of voice data to text data for execution of multiple functions. Moreover, an impact data received from an IOT device like a smartphone may be in voice form. The Control tower 324 is able to capture the impact data and convert it to text for interpreting the information to identify a processing path for execution of recommended action. The system includes an impact data analyzer 316A for assessing the functions of the application that may be impacted due to change in the operational conditions.

The processor 308 may be implemented as a chipset of chips that include separate and multiple analog and digital processors. The processor 308 may provide coordination of the other components, such as controlling user interfaces, applications run by devices, and wireless communication by devices.

The Processor 308 may communicate with a user through control interface and display interface coupled to a display.

The display may be, for example, a TFT LCD (Thin-Film-Transistor Liquid Crystal Display) or an OLED (Organic Light Emitting Diode) display, or other appropriate display technology. The display interface may comprise appropriate circuitry for driving the display to present graphical and other information to an entity/user. The control interface may receive commands from a user and convert them for submission to the processor 308. In addition, an external interface may be provided in communication with processor 308, so as to enable near area communication of device with other devices. External interface may provide, for example, for wired communication in some implementations, or for wireless communication in other implementations, and multiple interfaces may also be used.

In an embodiment, the data cleansing and normalization engine 313 is configured to clean data received at the data lake 306 in real time using natural language processing and machine learning algorithms for enhanced accuracy.

In an example embodiment, the data lake 306 includes plurality of databases as shown in FIG. 3. The data lake 308 includes a relational database 319 for storing related data sets received from distinct sources, a non-relational database 320 for storing non-related raw data sets, a functional database 321 for storing a library of functions enabling creation of a plurality of data models for execution of tasks in one or more applications including ERP and SCM, a plurality of registers 323 for temporarily storing impact data for determination of impact of the data on the application like change occurrence of hurricane. The received data may be image data, voice data or text data where the image and voice data can be converted to text data for analysis. The data lake 306 further includes a data model database 322 for storing plurality of data models, where the data models enables prediction of impact data on the one or more applications.

The data lake 306 may be supported by different memory like a volatile memory, a non-volatile memory or memory that may also be another form of computer-readable medium, such as a magnetic or optical disk. The memory may also include one or more storage devices capable of providing mass storage. In one implementation, at least one of the storage devices may be or contain a computer-readable medium, such as a floppy disk device, a hard disk device, an optical disk device, a tape device, a flash memory or other similar solid-state memory device, or an array of devices, including devices in a storage area network or other configurations.

Referring to FIG. 3, the various elements like the support architecture 304 and the memory data lake 306 are shown as external connections to the server 303 in accordance with an embodiment of the invention. However, it shall be apparent to a person skilled in the art that these elements may be part of an integrated server system. Also, some of the sub-elements of the support architecture 304 and the memory data store 307 either alone or in various combinations may be part of a server system as other external connections.

In an embodiment the tracking module 315 of the system 300 is an IOT device or smart device configured to capture, store and transmit an impact data relevant to the one or more applications. The IOT device may be in secured communication with the at least one server 302 as part of the sub network.

In an example embodiment, the at least one IOT device may be a tracking device, an intelligent sensor, a smartphone, a voice controller, an image capturing device, a gesture controller, a smart watch or a combination thereof. The IOT device may include sensor processors with internal circuitry that may include processor, memory and storage device. The IOT device data includes sensor data on plant machinery, logistics carriers, security systems, warehouse cameras and sensors etc.

In an exemplary embodiment the control tower 324 is configured for real time visualization of flows in the one or more applications, switching between data models, setting up alert-notifications, data analytics, ensuring security of the data. wherein the tower enables easy communication between the nodes as well as allows having visibility and manages the plurality of functions across the one or more applications.

In an embodiment, the received data includes attributes of different types including alphabets, numbers, images, wherein the tower is configured for controlling application of multiple data models on the received data including switching between data models in real-time.

In an embodiment, the plurality of distinct data sources/entities includes internet of things (IOT), demand from various sources at different levels like retailers, distribution channels, POS systems, customer feedback, supplier collaboration platform, invoices, purchase orders (PO), finance modules, inventory management module, contracts and RFx module, supplier module, item master, bill of materials, vendor master, warehouse management module, logistics management module, social media, weather, real time commodity and stock market prices, geo-political news etc. It shall be apparent to a person skilled in the art that the data source may include other source within the scope of the present invention.

In an embodiment, the system of the present invention includes means to add incremental data sources and entities.

In an example embodiment, the one or more applications include a plurality of nodes like inventory, logistics, warehouse, procurement, customers, supplier, retailers, distributors, resellers, co-packers and transportation wherein the nodes interact with each other to structure the plurality of functions associated with the applications. It shall be apparent to a person skilled in the art that the nodes may include other nodes within the scope of the present invention.

In an embodiment, the plurality of functions of the application function layer may include demand planning, supply planning, production planning, forecasting, smart factory and fulfillment planning among others. It shall be apparent to a person skilled in the art that the enterprise applications (EA) including supply china management (SCM) applications may include other functions within the scope of the present invention.

In an embodiment, the system is provided in a cloud or cloud-based computing environment.

In an embodiment the one or more enterprise application (EA) include supplier management operations, procurement operations, inventory management operations, account payable operations etc. An example of the present invention organizes the supply chain between manufacturers and service providers. In an example of the present invention, the supply chain management (SCM) operations include elements that enable management of end-to-end supply chain information such as demand planning, order fulfillment, scheduling, inventory, etc.

In an embodiment, the demand and supply of manufacturer offerings are planned utilizing the sub network in operation and orders for the manufacturer offerings are also managed utilizing the sub network with server and IOT devices in communication with each other for data capturing and exchange. The sub network is also utilized to manage sub network assets including providing maintenance and service for the sub network assets utilizing the sub network.

In one of the advantageous aspects of the present invention, control tower system provides revenue enhancement, cost reduction and capital reduction by efficient utilization of resources with reduced timelines due to analysis of impact data impacting multiple functions across ERP and SCM.

In an embodiment, the at least one server includes a front-end web server communicatively coupled to at least one SQL server wherein the front-end web server is configured for reprocessing the functions of the one or more applications based on the impact of an event on the one or more enterprise application (EA) functions/operations. The system 300 includes an execution engine 314 for receiving changed data and generating impact data processed from the front-end web server for determining impact of change on plurality of functions of the one or more applications to predict and recommend a task/action through an application recommendation engine 316 to the user for enabling the user to initiate the action through an electronic user interface. The system also includes a data verification engine 317 configured to verify impact data received by the control system and processed to reconfigure one or more operations of the application.

Figure 4:
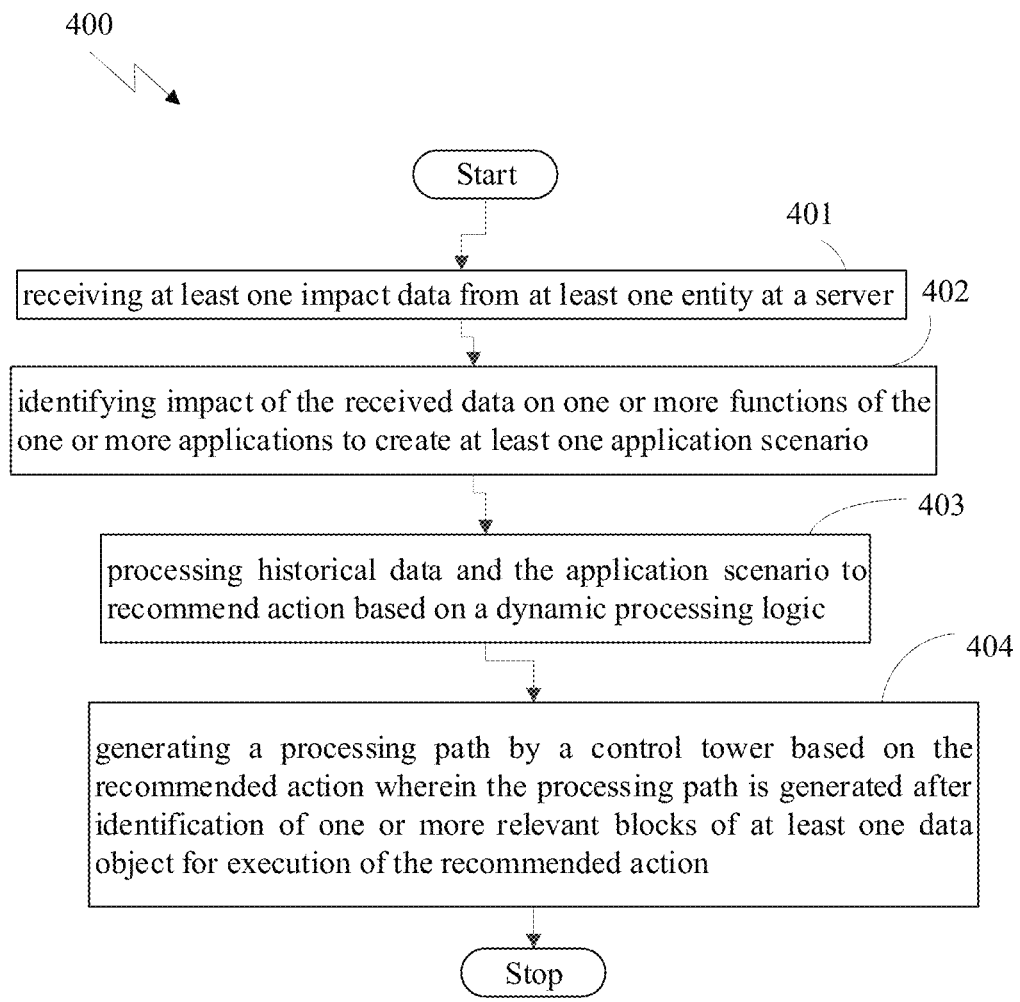
FIG. 4 is a flowchart depicting a method for operating one or more application in accordance with an embodiment of the invention.

Referring to FIG. 4 a flowchart depicting a method of operating one or more applications by a linkedchain based control tower is shown in accordance with an embodiment. The method comprises the steps of 401 receiving an impact data from at least one entity at a server. In step 402 identifying impact of the received data on one or more functions of the applications to create at least one application scenario. In step 403 processing historical data and the application scenario to recommend action based on a dynamic processing logic and in step 404 generating a processing path by a control tower based on the recommended action wherein the processing path is generated after identification of one or more relevant blocks of at least one data object for execution of the recommended action.

In an embodiment, the at least one impact data includes a data or information impacting one or more operations of the application including natural calamity, fluctuation in market indices, social sentiments, logistics, political crisis and policy changes through labor laws, taxation, economy, import & export policies, international trading laws, customer satisfaction survey and technology improvements.

In an embodiment, the dynamic processing logic integrates deep learning, predictive analysis, data extraction, impact analysis, configuration pattern generation and bots for processing the application scenario and historical data to recommend action.

In an embodiment, the one or more operations include demand planning, supply planning, inventory management, warehouse management, forecasting, cost modelling, transportation management, product life cycle management, purchase Order and sales management, work order management, receivables, supplier collaboration management, in an enterprise application including an ERP or a supply chain management application.

In an embodiment, the application scenario includes any enterprise application function enabling performance of one or more operations related to demand and supply of goods or services.

In an exemplary embodiment, the enterprise application is integrated with external data elements such as weather data, market indices, social sentiments data to have an integrated operations data model.

In an example embodiment, an event like change in weather impacts multiple long terms operations for an enterprise. The control tower picks up this signal or change in weather due to say hurricane, and automatically triggers a demand sensing algorithm. The demand sensing uses machine learning to come up with an accurate forecast of the demand pattern in the region which may have upside impact on certain products e.g. electric power generator, or downside impact on certain other products. The control tower sees the changes in forecast, notifies supply planner, and triggers a supply planning algorithm automatically when demand change is above a certain value. This helps in aligning supply with demand in an automated fashion. In turn, in an extended supply network, it allows the enterprise to collaborate with supply network entities like contract manufacturers, and extended supplier network. In case of any shortages of supply, it is highlighted, and the control tower shows alerts around the same with automated suggestions for resolution using machine learning algorithms. The application enables prediction of recommended actions such as getting additional supply transferred from an alternate location within certain distance radius from the location.

In another example embodiment, an event such as change in weather impacts near term plans for an enterprise. In case of a hurricane forecast for one region, demand planning algorithms generate upside forecast for certain consumer goods in stores for that region. The enterprise application enables ordering of goods to replenish distribution centers. However, if the hurricane gets diverted to another region just ahead of the forecast, then it creates a big issue. In such a scenario, the Control Tower picks up the diversion signal, and demand sensing algorithm is triggered automatically. The demand Sensing algorithm, powered by machine learning picks up the new ZIP codes that will be impacted by hurricane, and updates the forecast for the zip codes in both the regions. Now the supply needs in these regions have changed. Even though the total across the two regions may be in line with the original total quantity, the mix has changed in terms of which distribution centers and stores need to have the goods. The control tower picks up the demand signal in time, and create supply plan scenarios, thereby providing the user with an option of trans-shipping the goods from one region to another or procuring more in the new region locally where the hurricane is diverted. Each of the supply plan is scored on a metrics, and in turn user can make an appropriate choice. Thus, the control tower with capability to ingest data in real time, and act on it enables the user to assimilate the data, apply it on supply chain digital model and make the right decisions. This ensures that the right inventory is available at the right time, and revenue is not left on the table.

In another example embodiment, on receipt of information about another event like strike in a port where goods are to be received, the application enables rerouting of the goods in real time. Consider, a few containers are getting routed to a port. However, there is a strike in the port due to labor issues. Control Tower ingests this data and recognizes that some of the critical shipments are en-route to that port. At this stage, while the vessel is still in seas, logistics personnel can use the alert from the control tower and act to re-route the vessel to another port. This ensures that the shipments continue to move and are not stalled.

In an example embodiment, consider an even like the international funding agency comes up with projections for developing countries with a forecast indicating that specific regions with the country are slated to grow at a faster rate than expected with stable government and friendly economic policies. Such economic indicators influence demand for energy consumption. The Control tower has market indices integrated into the data model. This helps us with prediction of demand upside for energy company and associated impact on the grids that need to be built over a period.

In another example embodiment, consider an event like changes in marked indices that impacts cost and operational decisions for an enterprise. The Control tower enables flexible data model representing cost of product, project initiative, and in turn tying that model with market indices. Control tower has integrated thousands of market indices that include labor indices, material indices, economic indicators. For any product initiative that is getting planned, control tower has the ability to use market indices attached to cost elements, and come up aggregated projected cost for today, and projected cost for future time periods. Any change in market index, combined with forecasting algorithms for market index, generate cost forecast for the cost model. Control tower triggers alerts and recommends appropriate time when a requisition through RFX or sourcing event should be created.

In yet another example embodiment, the linkedchain control tower enables logistics tracking and invoicing. One of the key challenges in petroleum industry is not oil, gas or condensate but water. Billions and billions of gallons containing dissolved salts, grease and even naturally occurring radioactive materials. The cost of managing produced water is a significant factor in the profitability of oil and gas production. Typical challenges leading to dispute include real volume of produced water transported by a truck, time spent on site, delayed payments due to lack of confirmation or incorrect billing. In a linkedchain and blockchain model with consortium of distinct groups as its core players like Operators, Service Providers, disposal Company, Banks, IOT sensors on the trucks capture the exact volume transferred from tank to truck. This data is available through the blockchain and linking object of the control tower. By capturing key information about the chosen parameters, the potential disputes can be mitigated quickly and seamlessly such as invoice/billing process can be automated.

In exemplary embodiment, each of the plurality of machine learning (ML) models are built on real time data across all data points in the supply chain data lake, with multiple predictor attribute. This leads to models with higher degree of accuracy and confidence.

In another embodiment, any changes in the data in any of modules of the ERP system is sensed by the control tower and the real time dashboards and an auto-refresh/Auto-training of the ML models is triggered. In an exemplary aspect, the process is set such that the new model will be evaluated with the current model and will replace the current model only if it outperforms the current model.

In yet another embodiment, if there are any new data fields from new sources of data being added to the data lake, auto-ML will be triggered to conduct the entire process of exploratory data analysis, model building and deployment.

In an embodiment of the present invention, any enterprise application (EA) operation requires a finite amount of processing time on a computer processor. Further, the accuracy of results or any process depends on how faster impact data is analyzed for any application. The present invention restrains the process of generating a processing path as the fastest processing route for determining changes in functions, while simultaneously satisfying the needs of obtaining accurate results, data elements are organized/processed depending on the demands of the computing resources, which allow more functions of the one or more applications to be processed with same resources (e.g., disk space, processor speed, memory, etc.). For Eg., occurrence of a hurricane would change supplier lead time which would impact inventory, warehousing, transportation functions. The real time identification of the nodes or data blocks or processing path to incorporate impact of the change across multiple functions and applications is carried out using the same resource (data lake, control tower, processor, controller). Thus, the net result of the claimed invention provides improved processing and functioning of the systems. The logical processes involved with the system define the improvement.

Various computing devices referred to as IOT devices the entity machines, server, processor etc. of the present invention are intended to represent various forms of digital computers, such as laptops, desktops, workstations, personal digital assistants, and other appropriate computers. Computing devices of the present invention further intend to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this disclosure.

In an exemplary embodiment the present invention includes an integrated platform for supporting the various functions carried out by Control tower systems. The control tower collects data from different sources such as customer data, supplier onboarding data, data from social media into a data repository and enables more accurate forecasting, budgeting, Commodity management including pricing, variance, supplier risk and performance management and other benefits. More particularly, the integrated platform enables the prediction algorithm to identify and recommend action/tasks.

In an example embodiment, the complexity involved in execution of various supply chain management (SCM) and ERP operations require systems and methods that process these operations in reduced timelines with accuracy. Various operations like procurement, inventory management, distribution and warehousing etc., when executed in an integrated manner, do not merely perform the functions that each operation would perform separately. Also, the impact of change on the functions of one or more applications due to occurrence of an event in real time is reflected across the operations to achieve faster processing times, for example, during enterprise resource planning (ERP) operation. Consider, for example, SCM or ERP with demand planning, supply planning, production planning, fulfillment planning, and forecasting as functions in ERP and SCM applications. The bot and AI in a non-limiting example of the present invention creates data models that are novel in integrating various steps of these functions by analyzing changes to generate a processing path for processing the operation faster. Also, determining impact of the change in data on these functions enables faster processing with accuracy, more so, because combining two or more such functions leads to performance of another function i.e the combination of functions contributes towards performance of another function. In the above example, a sub-network is created based on the identified processing path, and functions associated with ERP and SCM applications of the sub network are identified. Consider some of the functions/operations as sub processes demand planning, supply planning, production planning, forecasting and fulfillment planning. Demand planning allows determination of a demand for an item or product considering occurrence of any event including hurricane or considering various facts like customer base, consumption, density of population is a geographic location etc. Supply planning determines actions to fulfill the requirements created from the demand planning with an objective to balance supply and demand in manner that achieves desired objectives in case of event impact. Production planning enables computation based on availability of items and capacities to meet customer demand by balancing the load on the manufacturing resources after considering the high throughput capacity of a plant. Forecasting determines estimate for demand of item, supply of item, and production of the item. Fulfillment planning ensures receiving of the item, packaging and shipping for eventual fulfillment of the order. Any change in demand due to occurrence of an event will affect all the processes in different manner. In case, the change is not reflected at any of the functions, it shall lead to error and inaccuracy in that function. In case of combining of the functions like demand planning and supply planning for fulfillment of order, certain factors are considered related to availability of the item itself. When these functions act independently, the supply planning may not consider the change in the item. Also, during the Production planning, a user may wish to restrict the material composition of the item based on the demand of the item due to occurrence of the event, thereby saving time on manufacturing items with undesired material characteristics. When functioning independently, these functions do not consider the changes in other functions of the SCM and ERP. These functions are integrated to perform another function of fulfillment planning. The AI engine and bot considers all these changes for automatically recommending actions/tasks. Also, it increases accuracy and reduces the time required for processing any function or combination thereof.

In an advantageous aspect, the Control tower System is based on Cloud based technologies and configured for enterprise units and trading organizations across a network. Cloud Services collect and aggregate all orders, shipments, inventory, and status. Data linked to enterprise and external systems will provide global visibility. Using Intelligent analysis and AI, the one or more application provides insights to users with real-time status of shipment, delivery date, acknowledgement of PO, delay in shipment, inventory availability, transportation costs. Further, it provides insight from purchase to delivery for each good. The system monitors end to end activities. For any exceptions, alert/warning will be triggered along with recommendations. Accuracy of Control Tower relies on consistency and timeliness of the data. Further the linkedchain control tower system enables simultaneous mirror to entire network of all transactions posted to ledger. Control Tower being one of the participant on a blockchain network will be able to authorize and collect the data and apply transformation rule Engine. Control Tower will receive data in real-time increasing accuracy, transparency and consistency of the data. Transactions like Orders, demand data, production schedules, weather, logistics are recorded instantly. It will reduce integration complexity for enterprise systems and partners, as organizations does not have to interface with multiple providers in different formats. Using blockchain all participants in the network has visibility and operate on same data.

In an advantageous aspect, the system includes complete enterprise application (EA) and SCM capabilities including real time demand planning form outside to inside (using external and historical data sources), production and inventory planning using demand, production and supplier data sources; Supply planning based on connecting real time demand with suppliers, Warehousing planning and optimization of warehouse spaces for productivity and safety; Logistics planning with full optimization capability based on demand, suppler and network route data. The system has full operational capability where different users can come and conduct their workflows, approvals and issue work orders, purchase orders, requisitions, etc. They will also be able to receive invoices, receipt orders from their suppliers (both Tier 1 and Tier II) suppliers.

Exemplary embodiments of the present invention, may be a system, a method, and/or a computer program product. The computer program product may include a computer readable storage medium (or media) having computer readable program instructions thereon for causing a processor to carry out aspects of the present invention including but not limited to processing prediction algorithm, determining. The media has embodied therein, for instance, computer readable program code (instructions) to provide and facilitate the capabilities of the present disclosure. The article of manufacture (computer program product) can be included as a part of a computer system/computing device or as a separate product.

The computer readable storage medium can retain and store instructions for use by an instruction execution device, for example, it can be a tangible device. The computer readable storage medium may be, for example, but is not limited to, an electromagnetic storage device, an electronic storage device, an optical storage device, a semiconductor storage device, a magnetic storage device, or any suitable combination of the foregoing. A non-exhaustive list of more specific examples of the computer readable storage medium includes the following: a hard disk, a random access memory (RAM), a portable computer diskette, a read-only memory (ROM), a portable compact disc read-only memory (CD-ROM), an erasable programmable read-only memory (EPROM or Flash memory), a digital versatile disk (DVD), a static random access memory (SRAM), a floppy disk, a memory stick, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the internet, a local area network (LAN), a wide area network (WAN) and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that which falls within the scope of the appended claims.

What is claimed is:

1. A linkedchain based Control tower system for operating one or more applications, the system comprising: a server configured to receive at least one impact data from at least one data object source; a memory storing a data lake, an analysis module coupled to an AI based rule engine, a recommendation engine, and an ingestion layer including at least one linking object, the at least one linking object having at least one connector element; and a processor configured to connect the at least one linking object to at least one data object to form a linked chain wherein a control tower is connected to the at least one data object by the at least one connector element wherein the at least one connector element includes a chain connector element and a non-chain connector element wherein the at least one chain connector element is configured for connecting with the at least one data object through a set of connection protocols wherein the at least one data object includes a blockchain network including a plurality of data blocks associated with one or more entities, wherein at least one block connector associated with the at least one linking object is configured to extend connection of the linking object to a newly added data block of a network, wherein the at least one block connector performs data validation, block validation, and configuration compatibility on the impact data before extending connection to the new data block, use an AI based rule engine to identify at least one impact of the received data on one or more functions of the applications to create at least one application scenario, use the recommendation engine to process a plurality of historical datasets and the application scenario to recommend action based on a dynamic processing logic, and generate a faster processing path based on the recommended action wherein the processing path is generated after identification of relevant blocks of the at least one data object for execution of the recommended action, wherein the analysis module processes the impact data for predicting the reconfiguration protocol where the reconfiguration is implemented based on identification of the faster processing path to execute the recommended action.

2. The system of claim 1, wherein the at least one data object is a non-blockchain network of at least one data block from one or more entities.

3. The system of claim 2, wherein the ingestion layer of the control tower further comprises:
a linked chain sync object having a multi-node compute engine triggered by the at least one linking objects and configured to sync the at least one linking object to a persistent data store and to decode metadata.

4. The system of claim 3, wherein the persistent data store is a linked Chain sync store configured for storing a plurality of data generated from the one or more blockchain networks.

5. The system of claim 3, wherein the at least one linking object includes at least one chain connector element configured to connect the control tower with the blockchain network through a set of connection protocols.

6. The system of claim 3, wherein the at least one linking object includes at least one non-chain connector element configured to fetch data from external APIs and authenticate the fetched data before sending to the control tower.

7. The system of claim 1, wherein the analysis module further comprises an electronic user interface (UI) configured for receiving and generating application related data through actionable analytical dashboard based on analysis of the impact data.

8. The system of claim 7, wherein the UI enables configuration of a plurality of application functions or workflows including task management, exception management, demand signal, alert generation location service and projected inventory.

9. The system of claim 1, further comprises a configurator and access control interface for enabling an admin user to interact with the at least on data object and the one or more applications.

10. The system of claim 1, wherein the information object includes one or more IOT devices configured to interact with the control tower for sending the impact data or execution of the recommended action.

11. The system of claim 1, further comprising a data manager configured to monitor execution of the recommended action.

12. The system of claim 1, wherein the dynamic processing logic integrates deep learning, predictive analysis, data extraction, impact analysis, configuration pattern generation and bots for processing the application scenario and historical data to recommend action.

13. The system of claim 12, wherein the one or more operations include demand planning, supply planning, inventory management, warehouse management, forecasting, cost modelling, transportation management, product life cycle management, purchase Order and sales management, work order management, receivables, supplier collaboration management, in an enterprise application including an ERP or a supply chain management application.

14. The system of claim 1, wherein the application scenario includes any enterprise application function enabling performance of one or more operations related to demand and supply of goods or services.

15. The system of claim 1, further comprising a data validation engine configured to analyze and validate data received from the at least one data object.

16. The system of claim 1, further comprising a rule aggregator configured to interact with the identified blocks and a master node of the control tower wherein the master node is encoded with instructions and functions as a bot for executing the recommended actions.

17. The system of claim 1, wherein the at least one data object includes distinct data sources entities, retailers, suppliers, demand drivers, distributers, clients, logistics companies, third party manufacturers or mobile and IOT device management companies, channel & marketing partners, customer feedback collectors including social sentiments, survey management companies, entities including sales data, sensors data from manufacturing plant, sensors bit info from logistics, sensors data from warehouse management on item location, item tracker entities, feedback from end customers through bloggers, feedback data from channel partners, purchase Order data from enterprise systems, invoices and sales order from customers, external entities including global economy, market indices details, inventory stock from warehouse.

18. The system of claim 1, further comprising a plurality of IOT devices including smart devices that capture data from one or more nodes and sends them to the control tower wherein the control tower enables communication between the nodes and provides visibility to manage the plurality of functions across the one or more applications.

19. The system of claim 16, wherein the control tower is configured for real time visualization of flows in the one or more applications, switching between data models, setting up alert-notifications, data analytics, and ensuring security of the data.

20. The system of claim 15, wherein the data includes attributes of different types including alphabets, numbers, images, wherein the tower is configured for controlling application of multiple data models on the received data including switching between data models in real-time.

21. The system of claim 1, wherein the at least one impact data includes a data or information impacting one or more operations of the one or more applications including at least one of at least one of natural calamity, fluctuation in market indices, social sentiments, logistics, political crisis and policy changes including labor laws, taxation, economy, import & export policies, international trading laws, customer satisfaction survey, technology improvements.

22. The system of claim 1, wherein the data lake is configured to store the historical datasets stored by the data lake is related to operations including at least one of inventory management, delivery management, transportation management, work order management, demand and supply planning, forecast, purchase order and invoice, real-time streams from manufacturing devices and consumer preference in regions, feeds from weather, social sentiments, economic and market indices.

23. A method of operating one or more applications by a linkedchain based control tower, the method comprises: receiving at least one impact data from at least one entity at a server; identifying impact of the received data on one or more functions of the one or more applications by an AI based rule engine to create at least one application scenario; processing by a recommendation engine, a plurality of historical datasets and the application scenario to recommend action based on a dynamic processing logic and generating a faster processing path by a control tower based on the recommended action wherein the faster processing path is generated after identification of one or more relevant blocks of at least one data object for execution of the recommended action wherein the control tower is connected to at least one data object by at least one connector element wherein the at least one connector element includes a chain connector element and a non-chain connector element wherein the chain connector element is configured for connecting with the at least one data object through a set of connection protocols wherein the at least one data object is a blockchain network including a plurality of data block associated with one or more entities, wherein at least one block connector associated with at least one linking object is configured to extend connection of the at least one linking object to a newly added data block of a network, wherein the at least one block connector performs data validation, block validation, and configuration compatibility on the impact data before extending connection to the new data block, wherein the analysis module processes the impact data for predicting the reconfiguration protocol where the reconfiguration is implemented based on identification of the faster processing path to execute the recommended action.

24. The method of claim 23, wherein the dynamic processing logic integrates deep learning, predictive analysis, data extraction, impact analysis, configuration pattern generation and bots for processing the application scenario and historical data to recommend action.

25. The method of claim 24, wherein the one or more operations include demand planning, supply planning, inventory management, warehouse management, forecasting, cost modelling, transportation management, product life cycle management, purchase Order and sales management, work order management, receivables, supplier collaboration management, in an enterprise application including an ERP or a supply chain management application.

26. The method of claim 23, wherein the application scenario includes any enterprise application function enabling performance of one or more operations related to demand and supply of goods or services.

27. The method of claim 23, further comprising a step of connecting one or more linking objects of a linkedchain of the control tower to one or more blockchain network.

28. The method of claim 23, wherein a data validation engine is configured to analyze and validate data received from the at least one data object.

29. The method of claim 23, wherein a rule aggregator is configured to interact with the identified blocks and a master node of the control tower wherein the master node is encoded with instructions and functions as a bot for executing the recommended actions.

30. The method of claim 29, wherein the control tower is configured for real time visualization of flows in the one or more applications, switching between data models, setting up alert-notifications, data analytics, and ensuring security of the data.

31. The method of claim 28, wherein the data includes attributes of different types including alphabets, numbers, images, wherein the tower is configured for controlling application of multiple data models on the received data including switching between data models in real-time.

32. The method of claim 23, wherein the at least one impact data includes a data or information impacting one or more operations of the one or more applications including at least one of at least one of natural calamity, fluctuation in market indices, social sentiments, logistics, political crisis and policy changes including labor laws, taxation, economy, import & export policies, international trading laws, customer satisfaction survey, technology improvements.

33. The method of claim 23, wherein the data lake is configured to store the historical datasets stored by the data lake is related to operations including at least one of inventory management, delivery management, transportation management, work order management, demand and supply planning, forecast, purchase order and invoice, real-time streams from manufacturing devices and consumer preference in regions, feeds from weather, social sentiments, economic and market indices.

34. A non-transitory computer readable medium having program instructions embodied therewith, the program instruction executable by a computing device to cause the device to:
receive at least one impact data from at least one entity at a server; identify impact of the received data on one or more functions of the one or more applications by an AI based rule engine to create at least one application scenario; process by a recommendation engine, a plurality of historical datasets and the application scenario to recommend action based on a dynamic processing logic; and generate a faster processing path by a control tower based on the recommended action wherein the faster processing path is generated after identification of one or more relevant blocks of at least one data object for execution of the recommended action wherein the control tower is connected to at least one data object by at least one connector element wherein the at least one connector element includes a chain connector element and a non-chain connector element wherein the chain connector element is configured for connecting with the at least one data object through a set of connection protocols wherein the at least one data object is a blockchain network including a plurality of data block associated with one or more entities, wherein at least one block connector associated with at least one linking object is configured to extend connection of the at least one linking object to a newly added data block of a network, wherein the at least one block connector performs data validation, block validation, and configuration compatibility on the impact data before extending connection to the new data block, wherein the analysis module processes the impact data for predicting the reconfiguration protocol where the reconfiguration is implemented based on identification of the faster processing path to execute the recommended action.

35. The non-transitory computer readable medium of claim 34, wherein the connector element is configured to intercept signals from various data sources to trigger demand sensing for determining an accurate forecast of a demand pattern depending on the impact data.

36. The non-transitory computer readable medium of claim 35, wherein the control tower is configured to assess changes in forecast, notify supply planner and trigger an alignment operation to connect demand with supply.

37. The non-transitory computer readable medium of claim 34, wherein the at least one connector element is a non-chain connector element for connecting with the at least one data object to fetch a set of data wherein the at least one data object is a non-blockchain network wherein the non-chain connector element is configured to authenticate the data received from the non-blockchain network before connecting to a control tower.

38. The non-transitory computer readable medium of claim 37, wherein the non-blockchain network includes external APIs and authenticate the fetched data before sending to the control tower linked-chain.

39. The non-transitory computer readable medium of claim 38, wherein the block connecter acts as a branch configured to perform data validation, block validation and configuration compatibility before extending connection to the new data block.

40. The non-transitory computer readable medium of claim 34, wherein the control tower is configured for real time visualization of flows in the one or more applications, switching between data models, setting up alert-notifications, data analytics, and ensuring security of the data.

41. The non-transitory computer readable medium of claim 34, wherein the dynamic processing logic integrates deep learning, predictive analysis, data extraction, impact analysis, configuration pattern generation and bots for processing the application scenario and historical data to recommend action.

42. The system of claim 1, wherein the control tower reconfiguration protocol is predicted using impact data processed by the analysis module.

43. The method of claim 23, wherein the control tower reconfiguration protocol is predicted using impact data processed by the analysis module.

44. The non-transitory computer readable medium of claim 34, wherein the control tower reconfiguration protocol is predicted using impact data processed by the analysis module.

45. The non-transitory computer readable medium of clam 34, wherein the at least one impact data includes a data or information impacting one or more operations of the one or more applications including at least one of at least one of natural calamity, fluctuation in market indices, social sentiments, logistics, political crisis and policy changes including labor laws, taxation, economy, import & export policies, international trading laws, customer satisfaction survey, technology improvements.

46. The non-transitory computer readable medium of clam 34, wherein the data lake is configured to store the historical datasets stored by the data lake is related to operations including at least one of inventory management, delivery management, transportation management, work order management, demand and supply planning, forecast, purchase order and invoice, real-time streams from manufacturing devices and consumer preference in regions, feeds from weather, social sentiments, economic and market indices.

* * * * *